US012516939B2

United States Patent
Higuchi et al.

(10) Patent No.: US 12,516,939 B2
(45) Date of Patent: Jan. 6, 2026

(54) SYSTEMS AND METHODS FOR CORRECTING VEHICLE POSITION ESTIMATIONS BASED ON LANDMARKS DETECTED IN AN ENVIRONMENT

(71) Applicant: TOYOTA MOTOR ENGINEERING & MANUFACTURING NORTH AMERICA, INC., Plano, TX (US)

(72) Inventors: Takamasa Higuchi, Mountain View, CA (US); Kentaro Oguchi, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 325 days.

(21) Appl. No.: 18/172,565

(22) Filed: Feb. 22, 2023

(65) Prior Publication Data

US 2024/0280365 A1    Aug. 22, 2024

(51) Int. Cl.
G01C 21/00    (2006.01)
G01C 21/16    (2006.01)
G01C 21/20    (2006.01)

(52) U.S. Cl.
CPC ......... *G01C 21/165* (2013.01); *G01C 21/206* (2013.01)

(58) Field of Classification Search
CPC ..... G01C 21/165; G01C 21/206; G01C 21/00
USPC ....................................................... 701/400
See application file for complete search history.

(56) References Cited

U.S. PATENT DOCUMENTS

| 9,874,450 | B2 | 1/2018 | Vakharia | |
|---|---|---|---|---|
| 2009/0096878 | A1* | 4/2009 | Chen | H04N 19/86 348/208.6 |
| 2013/0085596 | A1* | 4/2013 | Shani | G08G 1/14 414/231 |
| 2019/0283536 | A1* | 9/2019 | Suzuki | G06Q 10/0836 |
| 2020/0132473 | A1* | 4/2020 | Shipley | G01C 21/1652 |

(Continued)

OTHER PUBLICATIONS

Zhao et al., "VeTrack: Real Time Vehicle Tracking in Uninstrumented Indoor Environments," SenSys '15: Proceedings of the 13th ACM Conference on Embedded Networked Sensor Systems, Nov. 2015, pp. 99-112 (https://doi.org/10.1145/2809695.2809726).

(Continued)

*Primary Examiner* — Shardul D Patel
(74) *Attorney, Agent, or Firm* — SHEPPARD, MULLIN, RICHTER & HAMPTON LLP; Daniel N. Yannuzzi

(57) ABSTRACT

Systems and methods are provided for correcting vehicle position estimations are provided. In an example implementation, the systems and methods disclosed herein detect a first landmark and determining a first position of the detected first landmark in a first section of an environment using one or more sensors of a vehicle while the vehicle travels in the first section, estimate a position of the vehicle in a second section of the environment, and update the estimated position of the vehicle in the second section according to the first position of the detected first landmark in the first section of the environment. In an illustrative example, the environment can be an indoor environment, such as, but not limited to, a multi-floor parking structure where the first section a floor and the second section is another floor.

20 Claims, 6 Drawing Sheets

(56) References Cited

U.S. PATENT DOCUMENTS

| | | | |
|---|---|---|---|
| 2022/0042823 A1* | 2/2022 | Lee | G01C 11/02 |
| 2023/0243657 A1* | 8/2023 | Kiyohara | G08G 1/166 |
| | | | 701/446 |

OTHER PUBLICATIONS

Gao et al., "VeMap: Indoor Road Map Construction via Smartphone-Based Vehicle Tracking," 2016 IEEE Global Communications Conference (Globecom), Dec. 2016, 6 pages (https://doi.org/10.1109/GLOCOM.2016.7842373).

Li et al., "Collaborative Mapping and Autonomous Parking for Multi-Story Parking Garage," IEEE Transactions on Intelligent Transportation Systems 19(5):1629-1639, Mar. 7, 2018 (https://doi.org/10.1109/TITS.2018.2791430).

Cherian et al., "ParkLoc: Light-Weight Graph-Based Vehicular Localization in Parking Garages," Proceedings of the ACM on Interactive Mobile Wearable and Ubiquitous Technologies 2(3), Article 99, Sep. 2018, pp. 1-23 (https://doi.org/10.1145/3264909).

Kümmerle et al., "Autonomous Driving in a Multi-Level Parking Structure," 2009 IEEE International Conference on Robotics and Automation (ICRA), May 2009, pp. 1-6 (http://ais.informatik.uni-freiburg.de/publications/papers/kuemmerle09icra.pdf).

\* cited by examiner

SYSTEMS AND METHODS FOR CORRECTING VEHICLE POSITION ESTIMATIONS BASED ON LANDMARKS DETECTED IN AN ENVIRONMENT

TECHNICAL FIELD

The present disclosure relates generally to systems and methods for vehicle positioning, and, more particularly, some embodiments relate to updating vehicle positions estimated while traveling in indoor and/or underground environments.

DESCRIPTION OF RELATED ART

Global Positioning Systems (GPS) and similar global navigation satellite systems (GNSS) provide drivers an ability to know their locations at any time outdoors. The location awareness enables drivers to make proper decisions and gives drivers a sense of "control." GPS and similar GNSS systems are satellite-based radionavigation systems that provide geolocation and time information to a receiver where there is a connection with satellites of the GPS/GNSS. However, whenever communication is lost, such as while traveling in an indoor environment, such as underground parking structures or multi-level parking structures, GPS/GNSS signals may be obstructed or otherwise lost. As a result, location awareness may be lost, causing confusion and disorientation.

BRIEF SUMMARY OF THE DISCLOSURE

According to various embodiments of the disclosed technology, systems and methods for managing vehicles to mitigate risk to the vehicles due to anomalous driving behavior are provided.

In accordance with some embodiments, a method for correcting vehicle position estimations is provided. The method comprises detecting a first landmark and determining a first position of the detected first landmark in a first section of an environment using one or more sensors of a vehicle while the vehicle travels in the first section. The method also comprises estimating a position of the vehicle in a second section of the environment, and updating the estimated position of the vehicle in the second section according to the first position of the detected first landmark in the first section of the environment.

In another aspect, a vehicle capable of correcting vehicle position estimations is provided. The vehicle comprises a plurality of sensors configured to detecting conditions of an environment, a memory storing instructions, and one or more processors communicably coupled to the memory. The one or more processors are configured to execute the instructions to detect a first landmark and determine a first position of the detected first landmark in a first section of an environment using one or more sensors of the plurality of sensors while the vehicle travels in the first section. The one or more processors are further configured to estimate a position of the vehicle in a second section of the environment, and update the estimated position of the vehicle in the second section according to the first position of the detected first landmark in the first section of the environment.

In another aspect, an apparatus is provided. The apparatus comprises a plurality of sensors configured to detecting conditions of an environment and a position estimation system configured to estimate positions of the apparatus within the environment based on inputs from a first subset of sensors of the plurality of sensors. The apparatus also comprises a position correction system configured to detect a plurality of landmarks in the environment using a second subset of sensors of the plurality of sensors and correct estimated positions within the environment using positions associated with the detected landmarks.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
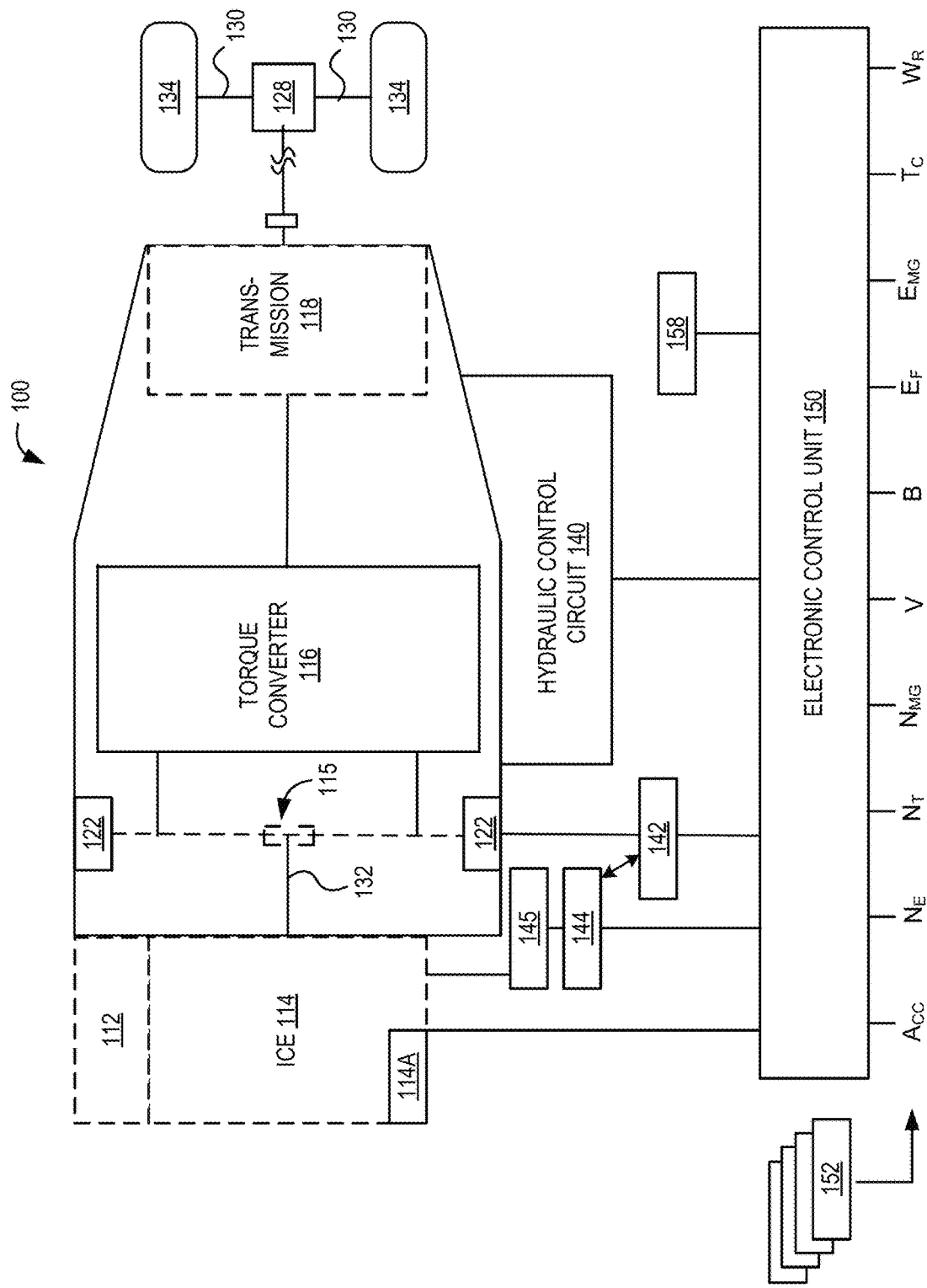
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

Embodiments of the disclosed technology provide for systems and methods for correcting vehicle position estimations. Position estimates may be inaccurate or unreliable, for example, while traveling in an indoor and/or underground environment, such as underground or multi-level parking structures. Embodiments disclosed herein may be leveraged to correct position estimations based on landmarks detected while traveling in an environment. Example landmarks include, but are not limited to, speed bumps, corners, posted signage, ramps, among other landmarks that may be repeated within an environment. In an example implementation, landmarks may be detected along a first section of an environment, which can be used as nodes to generate a topographical map of the first section of the environment. The detected landmarks can be used to correct position estimations made while traveling in a second section of the environment. For example, vehicle positions within the second section can be estimated while traveling therein, and these estimated positions can be updated to positions of landmarks detected in the first section.

The term indoor environment(s) is used herein to refer to indoor environments; underground environments, such as underground parking structures; multi-level environments, such as multi-level parking structures; tunnels; and any environment in which positioning signal, such as those used in GPS/GNSS, are weak or obstructed, thereby being unable to provide adequate positioning information.

As alluded to above, location awareness afforded by satellite signals—such as GPS/GNSS signals—may not work well in indoor/underground environments. Thus, the availability of location-based services (e.g., route navigation) in indoor environments may be restricted. As a result, drivers may become confused or disoriented.

Providing real-time vehicle positioning while traveling in an indoor environment will permit drivers to orient themselves relative to a large and unfamiliar environment. However, real-time vehicle positioning indoors may not be straightforward. Some conventional approaches relied on radio frequency (RF) signals such as WiFi and cellular to assist with providing GPS/GNSS signals. However, these RF signals can be sparse, intermittent, or nonexistent in environments lacking the devices for supplying such signals. Installing such devices is not always feasible because of time and costs to acquire, install, and maintain the devices.

Another conventional approach uses dead reckoning techniques. Dead reckoning estimates positions by analyzing wheel speed, steering wheel angle, and/or inertial sensor measurements from inertial measurement units (IMUs) to estimate a vehicle position and heading angle relative to a previous vehicle position and heading. However, IMU sensors can be noisy, which can reduce sensitivity of the sensor measurements, which cause errors in estimated position. Furthermore, tire slip on traveling surfaces can add to the errors. Positioning errors can accumulate over time.

To address the positioning errors, some approaches use a digital map to adjust the output of a dead reckoning system. These conventional approaches rely on a prestored digital map for matching making. For example, once a GPS signal is lost, inertial sensors may be used to estimate a trajectory of the vehicle. The estimated trajectory is overlaid onto features of a digital map, such as a roadway or lane, to mitigate positioning errors. When the inertial sensors detect a landmark, the estimated vehicle position is corrected to the geolocation of the nearest landmark of the same kind, where the geolocation is retrieved from the digital map. Thus, the conventional approaches require a prestored digital map describing accurate geometry of environment, including roads, lanes, and landmarks, to correct estimate positions. However, the digital map may not always be available, for example, digital maps of an interior of a parking structure may not be available in many parking facilities.

Accordingly, embodiments disclosed herein provide for correcting vehicle positions without relying on a prestored road map of geolocations or features. Instead, the embodiments of the present disclosure detect one or more landmarks while traveling in a first section of an environment, which are used to correct estimated vehicle positions in a second, different section of the environment. For example, after traveling in the first section of the environment, the vehicle may travel in the second section. While traveling in the second section, the vehicle's position can be estimated, and landmarks in the second section can be detected. A landmark detected in the second section can be matched to a landmark detected in the first section. If the landmarks match, an estimated position of the vehicle, at a point in time when the landmark in the second section was detected, can be updated to the position of the landmark detected in the first section. The positions may be provided as a projection on 2-dimensional coordinate system, without consideration of altitude. As the vehicle travels, positions can be corrected according to the above, which provides for locations of landmarks and a trajectory of the vehicle. As a result, a prestored digital map is not necessary for correcting vehicle positions, because a topographical map for the second section can be generated by the embodiments disclosed herein using landmarks detected on a first section as nodes for the topographical map for the second path.

Embodiments disclosed herein also provide for synchronization of the topographical map generated by vehicles. For example, upon generating the topographical map for an indoor environment, a vehicle may upload the topographical map to a cloud-based server, such as when a wireless connection can be established (e.g., upon exiting the indoor environment). A subsequent vehicle may then enter the same indoor environment at a later time and download the topographical map from the cloud-based server. The subsequent vehicle can then use the topographical map to correct its position estimations while traveling in the indoor environment. In some embodiments, the subsequent vehicle may also update the topographical map based on detecting landmarks within the environment. For example, the subsequent vehicle may detect a landmark that does not match from the topographical map. The newly detected landmark may be used by the subsequent vehicle to update the topographical map locally on the vehicle, which can then be synchronized upon exiting the indoor environment.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example, hybrid electric vehicle (HEV) in which embodiments of the disclosed technology, may be implemented is illustrated in FIG. 1. Although the example described with reference to FIG. 1 is a hybrid type of vehicle, the systems and methods for position correction can be implemented in other types of vehicle including gasoline- or diesel-powered vehicles, fuel-cell vehicles, electric vehicles, or other vehicles.

FIG. 1 illustrates a drive system of an example vehicle 100 that may include an internal combustion engine 114 and one or more electric motors 122 (which may also serve as generators) as sources of motive power. Driving force generated by the internal combustion engine 114 and motors 122 can be transmitted to one or more wheels 134 via a torque converter 116, a transmission 118, a differential gear device 128, and a pair of axles 130.

As an HEV, vehicle 100 may be driven/powered with either or both of engine 114 and the motor(s) 122 as the drive source for travel. For example, a first travel mode may be an engine-only travel mode that only uses internal combustion engine 114 as the source of motive power. A second travel mode may be an EV travel mode that only uses the motor(s) 122 as the source of motive power. A third travel mode may be an HEV travel mode that uses engine 114 and the motor(s) 122 as the sources of motive power. In the engine-only and HEV travel modes, vehicle 100 relies on the motive force generated at least by internal combustion engine 114, and a clutch 115 may be included to engage engine 114. In the EV travel mode, vehicle 100 is powered by the motive force generated by motor 122 while engine 114 may be stopped and clutch 115 disengaged.

Engine 114 can be an internal combustion engine such as a gasoline, diesel or similarly powered engine in which fuel is injected into and combusted in a combustion chamber. A cooling system 112 can be provided to cool the engine 114 such as, for example, by removing excess heat from engine 114. For example, cooling system 112 can be implemented to include a radiator, a water pump and a series of cooling channels. In operation, the water pump circulates coolant through the engine 114 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 114. In other applications, either or both the water pump and the fan may be operated by electric current such as from battery 144.

An output control circuit 114A may be provided to control drive (output torque) of engine 114. Output control circuit 114A may include a throttle actuator to control an electronic throttle valve that controls fuel injection, an ignition device that controls ignition timing, and the like. Output control circuit 114A may execute output control of engine 114 according to a command control signal(s) supplied from an electronic control unit 150, described below. Such output control can include, for example, throttle control, fuel injection control, and ignition timing control.

Motor 122 can also be used to provide motive power in vehicle 100 and is powered electrically via a battery 144. Battery 144 may be implemented as one or more batteries or other power storage devices including, for example, lead-acid batteries, nickel-metal hydride batteries, lithium ion batteries, capacitive storage devices, and so on. Battery 144 may be charged by a battery charger 145 that receives energy from internal combustion engine 114. For example, an alternator or generator may be coupled directly or indirectly to a drive shaft of internal combustion engine 114 to generate an electrical current as a result of the operation of internal combustion engine 114. A clutch can be included to engage/disengage the battery charger 145. Battery 144 may also be charged by motor 122 such as, for example, by regenerative braking or by coasting during which time motor 122 operate as generator.

Motor 122 can be powered by battery 144 to generate a motive force to move the vehicle and adjust vehicle speed. Motor 122 can also function as a generator to generate electrical power such as, for example, when coasting or braking. Battery 144 may also be used to power other electrical or electronic systems in the vehicle. Motor 122 may be connected to battery 144 via an inverter 142. Battery 144 can include, for example, one or more batteries, capacitive storage units, or other storage reservoirs suitable for storing electrical energy that can be used to power motor 122. When battery 144 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 150 (described below) may be included and may control the electric drive components of the vehicle as well as other vehicle components. For example, electronic control unit 150 may control inverter 142, adjust driving current supplied to motor 122, and adjust the current received from motor 122 during regenerative coasting and breaking. As a more particular example, output torque of the motor 122 can be increased or decreased by electronic control unit 150 through the inverter 142.

A torque converter 116 can be included to control the application of power from engine 114 and motor 122 to transmission 118. Torque converter 116 can include a viscous fluid coupling that transfers rotational power from the motive power source to the driveshaft via the transmission. Torque converter 116 can include a conventional torque converter or a lockup torque converter. In other embodiments, a mechanical clutch can be used in place of torque converter 116.

Clutch 115 can be included to engage and disengage engine 114 from the drivetrain of the vehicle. In the illustrated example, a crankshaft 132, which is an output member of engine 114, may be selectively coupled to the motor 122 and torque converter 116 via clutch 115. Clutch 115 can be implemented as, for example, a multiple disc type hydraulic frictional engagement device whose engagement is controlled by an actuator such as a hydraulic actuator. Clutch 115 may be controlled such that its engagement state is complete engagement, slip engagement, and complete disengagement complete disengagement, depending on the pressure applied to the clutch. For example, a torque capacity of clutch 115 may be controlled according to the hydraulic pressure supplied from a hydraulic control circuit 140. When clutch 115 is engaged, power transmission is provided in the power transmission path between the crankshaft 132 and torque converter 116. On the other hand, when clutch 115 is disengaged, motive power from engine 114 is not delivered to the torque converter 116. In a slip engagement state, clutch 115 is engaged, and motive power is provided to torque converter 116 according to a torque capacity (transmission torque) of the clutch 115.

As alluded to above, vehicle 100 may include an electronic control unit 150. Electronic control unit 150 may include circuitry to control various aspects of the vehicle operation. Electronic control unit 150 may include, for example, a microcomputer that includes a one or more processing units (e.g., microprocessors), memory storage (e.g., RAM, ROM, etc.), and I/O devices. The processing units of electronic control unit 150, execute instructions stored in memory to control one or more electrical systems or subsystems 158 in the vehicle. Electronic control unit 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 150 receives information from a plurality of sensors included in vehicle 100. For example, electronic control unit 150 may receive signals that indicate vehicle operating conditions or characteristics, or signals that can be used to derive vehicle operating conditions or characteristics. These may include, but are not limited to accelerator operation amount ($A_{CC}$), a revolution speed ($N_E$), of internal combustion engine 114 (engine RPM), a rotational speed ($N_{MG}$), of the motor 122 (motor rotational speed), and vehicle speed ($N_V$). These may also include torque converter 116 output ($N_T$) (e.g., output amps indicative of motor output), vehicle speed or velocity (V), brake operation amount/pressure (B), battery SOC (i.e., the charged amount for battery 144 detected by an SOC sensor), tire circumference ($T_C$), and wheel speed or rotations ($W_R$). Accordingly, vehicle 100 can include a plurality of sensors 152 that can be used to detect various conditions internal or external to the vehicle and provide sensed conditions to electronic control unit 150 (which, again, may be implemented as one or a plurality of individual control circuits). In one embodiment, sensors 152 may be included to detect one or more conditions directly or indirectly such as, for example, fuel efficiency ($E_F$), motor efficiency ($E_{MG}$), hybrid (internal combustion engine 114+ MG 112) efficiency, acceleration, ACC, etc.

In some embodiments, one or more of the sensors 152 may include their own processing capability to compute the results for additional information that can be provided to electronic control unit 150. In other embodiments, one or more sensors may be data-gathering-only sensors that provide only raw data to electronic control unit 150. In further embodiments, hybrid sensors may be included that provide a combination of raw data and processed data to electronic control unit 150. Sensors 152 may provide an analog output or a digital output.

Sensors 152 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect objects in an environment surrounding vehicle 100, for example, traffic signs indicating a current speed limit, road curvature, obstacles, surrounding vehicles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
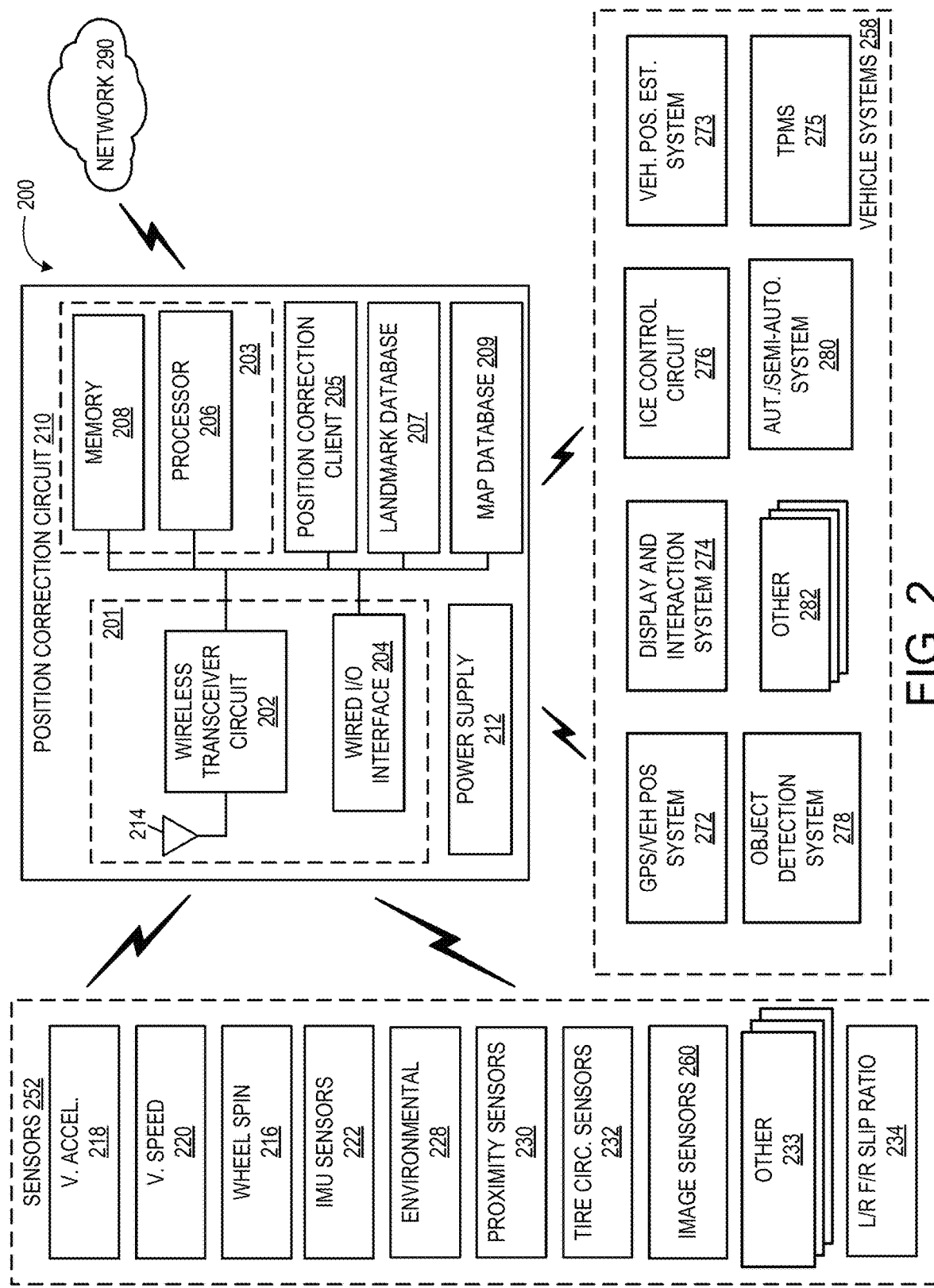
FIG. 2 illustrates an example architecture for position correction in accordance with one embodiment of the systems and methods described herein.

FIG. 2 illustrates an example architecture for position correction in accordance with one embodiment of the systems and methods described herein. Referring now to FIG. 2, in this example, position correction system 200 includes a position correction circuit 210, a plurality of sensors 252 and a plurality of vehicle systems 258. Sensors 252 (such as sensors 152 described in connection with FIG. 1) and vehicle systems 258 (such as subsystems 158 described in connection with FIG. 1) can communicate with position correction circuit 210 via a wired or wireless communication interface. Although sensors 252 and vehicle systems 258 are depicted as communicating with position correction circuit 210, they can also communicate with each other as well as with other vehicle systems. position correction circuit 210 can be implemented as an ECU or as part of an ECU such as, for example electronic control unit 150. In other embodiments, position correction circuit 210 can be implemented independently of the ECU.

Position correction circuit 210 in this example includes a communication circuit 201, a decision circuit 203 (including a processor 206 and memory 208 in this example) and a power supply 212. Components of position correction circuit 210 are illustrated as communicating with each other via a data bus, although other communication in interfaces can be included. Position correction circuit 210 in this example also includes position correction client 205 that can be operated to connect to cloud-based servers (including edge servers of a cloud network) hosted on a network 290.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store instructions and variables for processor 206 as well as any other suitable information, such as, one or more of the following elements: position data; vehicle speed data; risk and mitigation data, along with other data as needed. Memory 208 can be made up of one or more modules of one or more different types of memory, and may be configured to store data and other information as well as operational instructions that may be used by the processor 206 to position correction circuit 210. For example, position correction circuit 210 may include a landmark database 207 configured to store landmark data and a map database 209 configured to store map data, such as nodes, geolocations of nodes, and other features that may be used to generate a map. In some embodiments, data in landmark database 207 may be used as nodes in creating a virtual map stored in map database 209. According to an example, landmark database 207 and map database 209 may be included as modules of memory 208. In another example, landmark database 207 and map database 209 may be separate memories.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a position correction circuit 210.

Communication circuit 201 includes either or both a wireless transceiver circuit 202 with an associated antenna 214 and a wired I/O interface 204 with an associated hardwired data port (not illustrated). Communication circuit 201 can provide for vehicle-to-everything (V2X) and/or vehicle-to-vehicle (V2V) communications capabilities, allowing position correction circuit 210 to communicate with edge devices, such as roadside unit/equipment (RSU/RSE), network cloud servers and cloud-based databases, and/or other vehicles via network 290. For example, V2X communication capabilities allows position correction circuit 210 to communicate with edge/cloud servers, roadside infrastructure (e.g., such as RSU/RSE, which may be a vehicle-to-infrastructure (V21)-enabled street light or cameras, for example), etc. Position correction circuit 210 may also communicate with other connected vehicles over vehicle-to-vehicle (V2V) communications.

As this example illustrates, communications with position correction circuit 210 can include either or both wired and wireless communications circuits 201. Wireless transceiver circuit 202 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by position correction circuit 210 to/from other entities such as sensors 252 and vehicle systems 258.

Wired I/O interface 204 can include a transmitter and a receiver (not shown) for hardwired communications with other devices. For example, wired I/O interface 204 can provide a hardwired interface to other components, including sensors 252 and vehicle systems 258. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and NiH2, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 252 can include, for example, sensors 152 such as those described above with reference to the example of FIG. 1. Sensors 252 can include additional sensors that may or may not otherwise be included on a standard vehicle with which the position correction system 200 is implemented. In the illustrated example, sensors 252 include vehicle acceleration sensors 218; vehicle speed sensors 220; wheelspin sensors 216 (e.g., one for each wheel); inertial measurement unit (IMU) sensors 222; environmental sensors 228 (e.g., to detect salinity or other environmental conditions); proximity sensor 230 (e.g., sonar, radar, lidar or other vehicle proximity sensors); left-right and front-rear slip ratio sensors 234; and tire circumference sensors 232. IMU sensors 222 may comprise gyroscopes to measure and report angular velocity along pitch, yaw, and roll axis and accelerometers (e.g., 2-axis and/or 3-axis accelerometers) to measure and report specific force along perpendicular axes (e.g., a Cartesian coordinate system). Additional sensors 233 can also be included as may be appropriate for a given implementation of position correction system 200.

System 200 may be equipped with one or more image sensors 260. These may include front facing image sensors, side facing image sensors, and/or rear facing image sensors. Image sensors may capture information which may be used in detecting not only vehicle conditions but also detecting conditions external to the vehicle as well. External conditions may include information about an environment in which the vehicle is present, including objects and landmarks surrounding the vehicle. Image sensors that might be used to detect external conditions can include, for example, cameras or other image sensors configured to capture data in the form of sequential image frames forming a video in the visible spectrum, near infra-red (IR) spectrum, IR spectrum, ultra violet spectrum, etc. Image sensors 260 can be used to, for example, to detect objects in an environment surrounding a vehicle comprising position correction system 200, for example, surrounding vehicles, roadway environment, road lanes, road curvature, obstacles, speed bumps, posts or pillars of parking structures, posted signs, and so on. For example, a one or more image sensors 260 may capture images of surrounding vehicles in the surrounding environment. As another example, object detecting and recognition techniques may be used to detect objects and environmental conditions, such as, but not limited to, road conditions, surrounding vehicle behavior (e.g., driving behavior and the like), and the like. Additionally, sensors may estimate proximity between vehicles. For instance, the image sensors 260 may include cameras that may be used with and/or integrated with other proximity sensors 230 such as LIDAR sensors or any other sensors capable of capturing a distance. As used herein, a sensor set of a vehicle may refer to sensors 252.

Vehicle systems 258, for example, systems and subsystems 158 described above with reference to the example of FIG. 1, can include any of a number of different vehicle components or subsystems used to control or monitor various aspects of the vehicle and its performance. In this example, the vehicle systems 258 includes a vehicle positioning system 272; engine control circuits 276 to control the operation of engine (e.g. internal combustion engine 114 and/or motors 122); object detection system 278 to perform image processing such as object recognition and detection on images from image sensors 260, proximity estimation, for example, from image sensors 260 and/or proximity sensors, etc. for use in other vehicle systems; vehicle display and interaction system 274 (e.g., vehicle audio system for broadcasting notifications over one or more vehicle speakers), vehicle display system and/or the vehicle dashboard system); tire pressure monitoring systems 275; autonomous or semi-autonomous driving systems 280; and other vehicle systems 282 (e.g., Advanced Driver-Assistance Systems (ADAS), such as forward/rear collision detection and warning systems, pedestrian detection systems, autonomous or semi-autonomous driving systems, and the like). Other vehicle systems 282 may also include anti-lock braking systems, electronic stability control systems, tire pressure monitoring systems, among other systems capable of reporting tire circumference, wheel rotations, and vehicle heading (e.g., steering direction) based on signals from one or more sensors 252.

The vehicle positioning system 272 can include a global positioning system (GPS) or similar global navigation satellite systems (GNSS). Position correction circuit 210 may be installed on a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

Conventional GPS communication includes a GPS satellite in communication with a vehicle comprising a GPS tracking device. The GPS tracking device emits/receives a signal to/from the GPS satellite. For example, a GPS tracking device is installed into a vehicle. The GPS tracking device receives position data from the GPS tracking device. The position data gathered from the vehicle is stored in the tracking device. The position data is transmitted to the cloud server via a wireless network.

A conventional GPS provides positional information that describes a position of a vehicle with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by an Advanced Driver Assistance System (ADAS) of a modern vehicle require positioning information that describes the location of the vehicle with lane-level accuracy. In addition, the current standard for DSRC requires that the location of the vehicle be described with lane-level accuracy.

Autonomous or semi-autonomous driving systems 280 can be operatively connected to the various vehicle systems 258 and/or individual components thereof. For example, autonomous or semi-autonomous driving systems 280 can send and/or receive information from the various vehicle systems 258 to control the movement, speed, maneuvering, heading, direction, etc. of the vehicle. The autonomous or semi-autonomous driving systems 280 may control some or all of these vehicle systems 258 and, thus, may be semi- or fully autonomous.

Vehicle systems 258 also comprises a vehicle position estimation system 273 operatively connected to one or more vehicle systems 258 and/or individual components thereof. Vehicle position estimation system 273 can be configured to estimate a position of the vehicle using inputs received from vehicle systems 258 and/or sensors 252. For example, vehicle positioning system 272 may include a dead reckoning system that executes a dead reckoning algorithm to estimate a vehicle position based on measurements from one or more sensors 252. In an example implementation, the dead reckoning system analyzes wheel speed, steering wheel angle, and/or inertial sensor measurements from sensors 252 and/or vehicle systems 258 to estimate a current vehicle position and heading angle relative to a previous vehicle position and heading angle.

Figure 3:
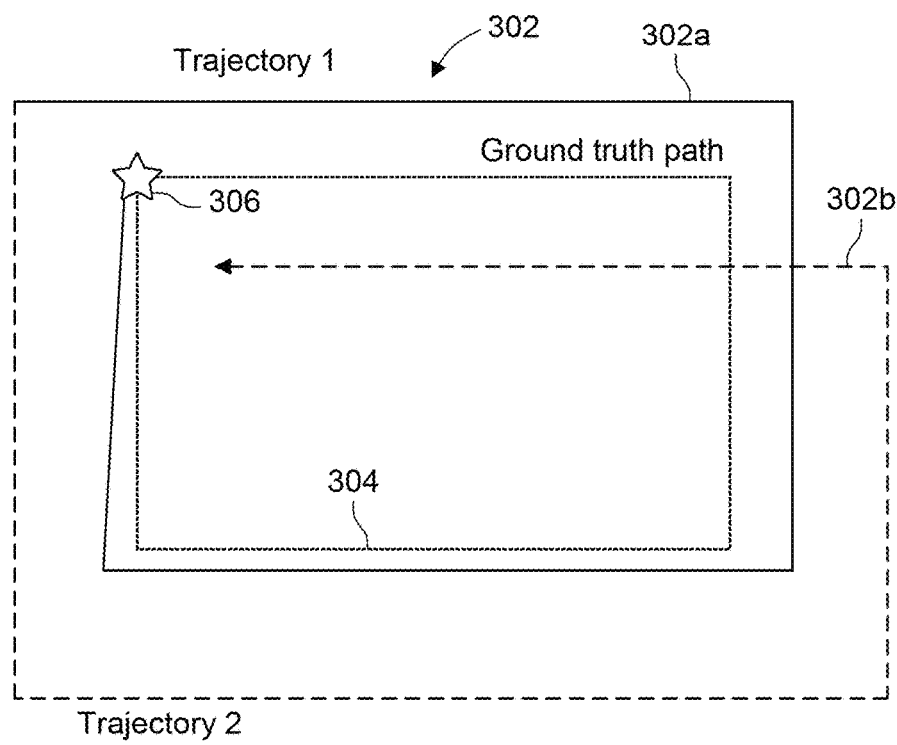
FIG. 3 illustrates an example trajectory estimation generated by a dead reckoning system overlaid on a ground truth trajectory.

FIG. 3 illustrates an example trajectory estimation 302 that can be output by a dead reckoning system (e.g., vehicle position estimation system 273) overlaid on a ground truth trajectory 304. For example, consider a multi-floor parking structure, where a vehicle enters through a gate on a first floor and then travels to subsequent floors. Before entering, the vehicle may use vehicle positioning system 272 to initialize its position and heading angle using satellite signals. At some point after entering the multi-floor parking structure, the connection with vehicle positioning system 272 may be lost, at which point the vehicle position estimation system 273 can be used to update the vehicle position by estimating distance traveled and changes in heading angle, for example, using dead-reckoning systems. Upon initialization, vehicle position estimation system 273 may use the last position and heading angle from vehicle positioning system 272 as a previous position and heading. Then each subsequent position and heading is determined relative to a previous position and heading.

In the example of FIG. 3, a ground truth trajectory 304, shown as a dashed line, provides an example of a ground truth of a multi-floor parking structure projected on to 2-dimensional coordinate spaces, such as ground surface viewed from top down. This configuration may not take altitude of the structure or floors into consideration. Thus, in this example, ground truth trajectory 304 for each floor may be projected onto each other so to appear as a single ground truth trajectory that represents all floors.

The vehicle may initialize its position at point 306, for example, upon entering the structure. The vehicle may then follow the ground truth trajectory 304 twice while going from a first floor to a second floor of the multi-floor parking structure. The trajectory estimation 302 comprises a first trajectory 302a of a vehicle estimated by a dead reckoning system while a vehicle travels on the first floor, and a second trajectory 302b of a vehicle estimated by a dead reckoning system while a vehicle travels on a second floor of the multi-floor parking structure.

At initialization point 306, trajectory estimation 302 and ground truth trajectory 304 match substantially. However, as the vehicle travels the trajectory estimation 302 deviates from ground truth trajectory 304 as shown, such as, due to noise in sensors 252 and vehicle systems 258. For example, the dead reckoning system iteratively estimates a current position and heading relative to a previous position and heading using sensors 252 and vehicle systems 258. The estimated positions and headings are combined to form trajectory estimation 302. However, due to noise in sensors 252 and vehicle systems 258, each estimated position may have some error that results in a deviation from ground truth trajectory 304. As the vehicle travels, the errors accumulate overtime resulting in increased deviation from ground truth trajectory 304.

Referring back to FIG. 2, network 290 may be a conventional type of network, wired or wireless, and may have numerous different configurations including a star configuration, token ring configuration, or other configurations. Furthermore, the network 290 may include a local area network (LAN), a wide area network (WAN) (e.g., the Internet), or other interconnected data paths across which multiple devices and/or entities may communicate. In some embodiments, the network may include a peer-to-peer network. The network may also be coupled to or may include portions of a telecommunications network for sending data in a variety of different communication protocols. In some embodiments, the network 290 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, Wi-Fi (infrastructure mode), Wi-Fi (ad-hoc mode), visible light communication, TV white space communication and satellite communication. The network may also include a mobile data network that may include 3G, 4G, 7G, LTE, LTE-V2V, LTE-V21, LTE-V2X, LTE-D2D, VoLTE, 7G-V2X or any other mobile data network or combination of mobile data networks. Further, the network 290 may include one or more IEEE 802.11 wireless networks.

In some embodiments, the network 290 includes a V2X network (e.g., a V2X wireless network). The V2X network is a communication network that enables entities such as elements of the operating environment to wirelessly communicate with one another via one or more of the following: Wi-Fi; cellular communication including 3G, 4G, LTE, 7G, etc.; Dedicated Short Range Communication (DSRC); millimeter wave communication; etc. As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 3G; 4G; 7G; LTE-V2X; 7G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X wireless message) described herein include, but are not limited to, the following messages: a Dedicated Short Range Communication (DSRC) message; a Basic Safety Message (BSM); a Long-Term Evolution (LTE) message; an LTE-V2X message (e.g., an LTE-Vehicle-to-Vehicle (LTE-V2V) message, an LTE-Vehicle-to-Infrastructure (LTE-V2I) message, an LTE-V2N message, etc.); a 7G-V2X message; and a millimeter wave message, etc.

During operation, position correction circuit 210 can receive information from various vehicle sensors and/or systems to estimate a position and correct the position of the vehicle in accordance with embodiments disclosed herein. Communication circuit 201 can be used to transmit and receive information between position correction circuit 210 and systems vehicle systems 258, and position correction circuit 210 and sensors 252. Also, sensors 252 may communicate with vehicle systems 258 directly or indirectly (e.g., via communication circuit 201 or otherwise).

In various embodiments, communication circuit 201 can be configured to receive data and other information from sensors 252 that is used in estimating positions of the vehicle. For example, communication circuit 201 can be used to send signals to various vehicle systems 258 as part of estimating a position. For example, communication circuit 201 can be used to send information of wheel speed, steering wheel angle, and/or inertial sensor measurements to one or more vehicle position estimation system 273 for estimating a current position of a vehicle relative to a previous position.

Communication circuit 201 can be also configured to receive data and other information from sensors 252 that is used in correcting positions of the vehicle. For example, as described in more detail below, communication circuit 201 can be used to send information from sensors 252 of detected landmarks to correction client 205 and/or to landmark database 207 for storage as landmark data. The landmark data can be accessed for correcting an estimate position of a vehicle using the detected landmarks as nodes. Examples of this are described in more detail below.

In various embodiments, communication circuit 201 can be configured to send data and other information to edge/cloud servers hosted on network 290. For example, as described in more detail below, landmark data stored in landmark database 207 can be used to generate a topographic map of an environment, which can be stored as map data in map database 209. Communication circuit 201 may send map data to an edge/cloud server for storage in a cloud-based database. The edge/cloud server can then provide the map data to another vehicle for use in correcting estimate positions of the other vehicle. Examples of this are described in more detail below.

Figure 4:
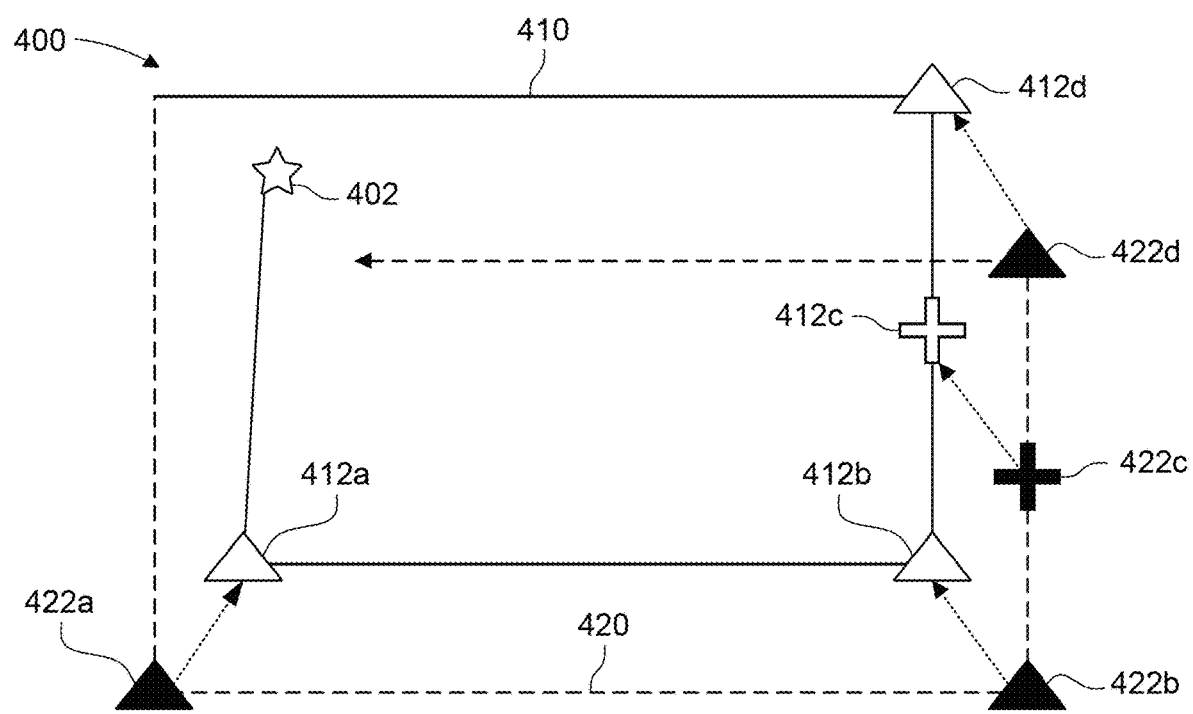
FIG. 4 illustrates an example trajectory generated in accordance with embodiments disclosed herein.

FIG. 4 illustrates an example trajectory 400 generated in accordance with embodiments disclosed herein. The trajectory 400 may be generated by, for example, position correction circuit 210 as the vehicle travels within an environment. In various embodiments, the environment is an indoor environment. Trajectory 400 comprises a first trajectory 410 and a second trajectory 420 that may be generated by position correction circuit 210. First trajectory 410 may be generated while the vehicle travels in a first section of the environment. Second trajectory 420 may be generated while the vehicle travels in a second section of the environment. The environment may comprise a first plurality of landmarks 412a-412d (collectively referred to herein as first plurality of landmarks 412) in the first section of the environment and a second plurality of landmarks 422a-422d (collectively referred to herein as second plurality of landmarks 422) in the second section.

Point 402 illustrates an initialization point of vehicle position estimation. For example, point 402 depicts a point at which the vehicle enters the environment and a connection with a satellite based position system is lost (e.g., vehicle positioning system 272). In some embodiments point 402 may represent a point at which a signal for vehicle positioning system 272 (e.g., a GPS signal) begins to degrade and vehicle position estimation system 273 is used to estimate positions. At initialization point 402, the vehicle may retain a most recent position and heading (e.g., such as GPS coordinates and information from vehicle positioning system 272) as initial position information, which the vehicle position estimation system 273 may use as an initial position.

As the vehicle travels along the first section of the environment, the vehicle position estimation system 273 estimates the position of the vehicle. Additionally, as the vehicle travels in the first section, the vehicle may detect landmarks 412 and register each detected landmark in landmark database 207 as landmark data. For example, using information obtained by sensors 252 and/or vehicle systems 258, position correction circuit 210 may detect the vehicle has turned a corner at a point in time after point 402, which can be registered as landmark 412a. Subsequently, the vehicle performs another turn, which is registered as landmark 412b. Next, the vehicle may travel over a speed bump, which may be registered as landmark 412c. Lastly (at least in this example), the vehicle may perform a third turn, which is registered as landmark 412d. Each landmark may be stored in landmark database 207 and associated with a respective distance and respective heading relative to point 402 or a preceding landmark. Using the respective distance and heading information, each landmark 412 may be tagged with a position (such as a geolocation) within the 2-dimensional coordinate space. By detecting landmarks 412 in the first section of the environment, a virtual map of the first section can be generated from a combination of landmarks 412 as nodes and trajectory 410. The virtual map may be stored in map database 209 as map data.

The virtual map of the first section can then be used to correct estimated positions of the vehicle traveling in the second or subsequent section of the environment. For example, as the vehicle travels along the second section of the environment, the vehicle position estimation system 273 continues to estimate the positions of the vehicle. Additionally, as the vehicle travels in the second section, the vehicle may detect landmarks 422. Upon detecting one of landmarks 422, position correction circuit 210 may check landmark database 207 for a matching landmark 412. If a matching landmark 412 is found, the position correction circuit 210 may correct the estimated position of the vehicle, in the 2-dimensional coordinate space, at the point in time at which the one landmark 422 was detected by updating the vehicle position to the 2-dimensional position of the matched landmark 412. The process repeats for each subsequent landmark 422 that is detected in the second section. As an illustrative example, the vehicle may detect landmark 422*a* using sensors 252 and/or vehicle systems 258, and then check landmark database 207 for landmark 412*a*. Since 412*a* was registered while traveling in the first section of the environment, position estimates from vehicle position estimation system 273 can be updated using the position of landmark 412*a* as the vehicle's position relative to landmark 422*a*. Thus, trajectory 420 can be generated with corrected position estimates by updating position estimates according to landmarks 412.

In various embodiments, checking landmark database 207 for a matching landmark may be based on landmark types. For example, upon detecting a landmark 422 in the second section of the environment, position correction circuit 210 may check if the same type of landmark (e.g., speed bump, corner, etc.) was detected along trajectory 410 at the similar 2-dimensional position. The estimated position of the currently detected landmark 422 may be checked against a stored position of a previously detected landmark 412. If the position of the detected landmark 422 is within a threshold distance of the position associated with landmark 412, the detected landmark 422 corresponds to the landmark 412 and is considered match. For example, upon detecting landmark 422*b*, the vehicle may estimate its current position relative to a previously detected landmark 422*a* and determine an estimated position for landmark 422*b* relative to landmark 422*a*. The vehicle can then check the position of landmark 412*b* relative to landmark 412*a* in the landmark data. If the estimated position of landmark 422*b* relative to landmark 422*a* is within a threshold distance of the position of landmark 412*b* relative to landmark 412*b*, then landmark 412*b* is considered a match for landmark 422*b* and the 2-dimensional position of landmark 422*b* can be updated to the 2-dimensional position of landmark 412*b*.

Upon finding a match, the current vehicle position can be corrected to the position of the landmark 412*b* as translated to the second section. That is, the relative position of landmark 412*b* with respect to the other landmarks 412 is known in landmark data. Thus, this relative position can be translated to relative positions between landmark 422*b* with other matched landmarks 422. Using the known relative positions of landmarks, the position of vehicle at the point when the vehicle detected landmark 422*b* can be corrected to the position of landmark 422*b*.

If a match is not found for a detected landmark, the detected landmark may be considered a newly detected landmark and stored in landmark database 207. The newly detected landmark can be tagged with an estimated position at the time of detection and with a landmark type. The newly detected landmark can be used later in a subsequent section for landmark matching.

In various embodiments, position estimation accuracy may be optimal when initialized upon entering an environment (e.g., when estimates are provided by vehicle positioning system 272 at point 402) and gradually degrades while updating the vehicle position by vehicle position estimation system 273. Thus, estimated positions of landmarks detected closer in time and distance from point 402 may be more accurate than those detected later. Particularly, for example, position estimates relative to point 402 in the first section of the environment may be more accurate than those in the second section. Thus, the relative positions in the first section may be translated to the second section to provide improved accuracy in position estimation.

In an illustrative example, the environment may be a multi-floor parking structure in which the vehicle travels. In this case, a first floor may be an example of the first section of the environment and a subsequent floor (e.g., second or later floor) may be an example of the second section. In the case of multi-floor parking structures, different floors of the same parking structure may be commonality in landmarks between floors. As a result, landmarks may be located at relatively similar positions on each floor when projected into a 2-dimensional coordinate space without consideration to altitude. That is, for example, speed bumps may be located at approximately the same location on different floors, road geometry may be substantially similar across floors such that corners are similarly situated between floors, road signage may be similar between floors, etc. As such, landmarks detected on a first floor may be representative of landmarks present on subsequent floors. However, the embodiments disclosed herein are not limited to multi-floor parking structures, and can be applied to any environment in which commonality in landmark positioning exists between different sections of an environment.

Figure 5:
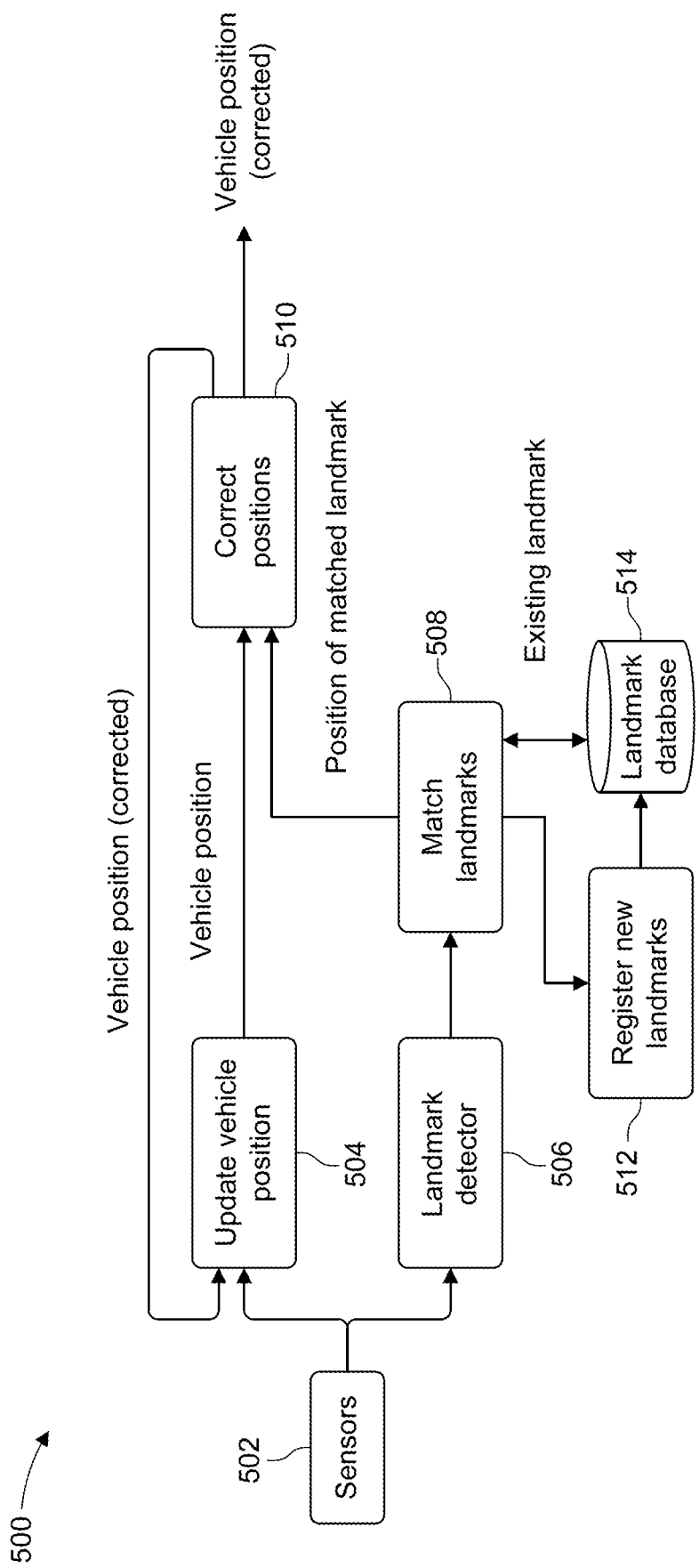
FIG. 5 is a flow chart illustrating example operations for correcting vehicle position estimations in accordance with various embodiments disclosed herein.

FIG. 5 is a flow chart illustrating example operations for correcting vehicle position estimations in accordance with various embodiments disclosed herein. FIG. 5 provides a process 500 for correcting estimated vehicle positions based on landmarks detected within an environment. Process 500 may be implemented as instructions, for example, stored on position correction circuit 210, that when executed by one or more processors perform one or more operations of process 500. The process 500 will be described below with reference to FIGS. 2 and 4 as illustrative examples. However, one skilled in the art will appreciate that the embodiments disclosed herein are not to be limited to this implementation only. For example, while the following description will be made with reference to vehicular systems, the embodiments disclosed herein may be applied to other systems as desired.

At block 502, sensors collect data for use by downstream operations. For example, one or more sensors 252 collect data as described above as a vehicle travels within an environment.

At block 504, a vehicle position is updated to provide an estimate of a current vehicle position using information obtained in block 502. In an example, a current vehicle position may be provided by a vehicle positioning system, such as a GPS that provides a current position as GPS coordinates. For example, upon initialization of the process 500, such as upon entering the environment.

In a case where the signal of a vehicle positioning system degrades, a dead reckoning system (e.g., vehicle position estimation system 273) may update the vehicle position relative to a preceding position using measurements provided by one or more of sensors 252. In an example, a vehicle's trajectory may be divided into a number of window of travel time along the travel path (e.g., a 100-millisecond period in some example, but other windows may be used depending on desired granularity of the position estimation). Block 504 may obtain vehicle speed data from sensors 252 (e.g., vehicle speed sensors 220), which may be used to estimate a distance traveled during a current window of travel time. Block 504 may also obtain left and right wheel speeds from sensors 252 (e.g., wheelspin sensors 216) and determine a difference between left and right wheel speeds, which may be used to estimate changes in heading angle. The estimated distance traveled during the current time window and estimated changes in heading angle can be combined to estimate a motion vector (e.g., direction/heading and distance) of the vehicle for the current time window step. A current vehicle position can be estimate by adding the estimated motion vector to a previously estimated vehicle position from a prior time window step, thereby updating the vehicle position. Estimated vehicle positions for a number of time window steps can be aggregated to provide an estimated trajectory.

In another embodiment, a dead reckoning system may be configured to track altitude of the vehicle in addition to 2-dimensional coordinates (e.g., latitude and longitude). The 2-dimensional coordinates may be determined using estimated distance traveled and estimated changes in heading angle compared to a previous estimated position, as described above. A vehicle-embedded barometer as one of sensors 252 (e.g., additional sensors 233) can detect changes in altitude. As another example, a road grade sensor (e.g., as an additional sensor 233) can be combined with wheel-speed-based travel distance estimations. In this embodiment, a 3-dimensional trajectory can be estimated by the dead reckoning engine, which can be projected onto a ground surface to convert the 3-dimensional trajectory to a 2-dimensional trajectory.

In either case, the updated vehicle position is provided to block 510 as a current estimated position of the vehicle.

At block 506, while the vehicle travels within an environment, landmarks can be detected using information obtained at block 502. For example, information obtained from sensors 252 and/or vehicle systems 258 can be analyzed to detect the presence of a landmark within the environment. Example landmarks include, but are not limited to, speed bumps, corners, changes in angular slope, and signage posted within the environment. In some embodiments, IMU sensors 222, wheelspin sensors 216, and other sensors 233 (such as steering wheel angle sensors) can be used to detect landmarks. For example, a speed bumps can be detected by IMU sensors 222 measuring relatively large, unexpected spikes in vertical accelerations. A corner can be detected by monitoring history of estimated vehicle positions, thereby recognizing when heading has changed to a degree that indicates a turning maneuver was executed through a corner. A corner may also be detected through monitoring difference between left and right wheel speeds, which may be used to estimate changes in heading angle. If the difference is large enough, the vehicle likely executed a turn and the direction can be derived by identifying which wheel exhibited the larger speed. A change in angle of a slope can be detected by monitoring the pitch angle of the vehicle, for example, using IMU sensors 222, a vehicle-embedded barometer, and/or a road grade sensor. Signs posted in the environment (e.g., stop signs, exit signs, etc.) can be detected based on vehicle operations. For example, a stop sign can be detected when a vehicle comes to a stop and then resume a few seconds later. The stop may be a complete stop or a substantial stop (e.g., a rolling stop in which the vehicle moves at 1 mph or less).

In some embodiments, image sensors 260 may be used to monitor the environment and image data can be processed to detect landmarks. For example, object detection algorithms can be executed on image data, radar measurements, lidar measurements, etc. by object detection system 278 to identify characteristic patterns within the parking structure such as in a roads, traffic signs, or sign boards. However, detection by IMU sensors generally requires less computational overhead (e.g., less processing power and memory) as compared to more computationally intensive object detection algorithms.

In some embodiments, landmarks may be detected based on a set of defined rules applied to features extracted from raw sensor data. For example, a set of defined thresholds may be set that can be used in landmark detection. If a feature of sensor data exceeds the set threshold for that feature, the feature can be considered as indicative of a landmark. For example, in the case of a speed bump, if the vertical acceleration data from IMU sensors 222 exceeds a set threshold acceleration (e.g., is greater than a baseline corresponding to acceleration measurements due to road surface textures), then the vehicle may detect a speed bump. As another example, in the case of a corner, if a change in vehicle heading is greater than a set threshold value, then the change in heading can be classified as a turn and a corner detected. The threshold value in this example may be based on an angle that distinguishes between a course adjustment or swerve and a turning maneuver around a corner. For example, a 90 degree change in 2-dimensional coordinate space would indicate a turn, while a 5 degree change may indicate a swerve or course correction. In some embodiments, the threshold value may be 45 degrees. In another example, the threshold may be larger (e.g., 50 degrees, 60 degrees) or smaller (e.g., 40 degrees, 30 degrees) based on the desired implementation. In yet another example, the threshold of a change in angle of a slope may be set according to the desired application. For example, the threshold may be 5 degrees or more.

In some embodiment, machine learning and artificial intelligence algorithms may be utilized to train the position correction circuit 210 to detect landmarks from information obtained from sensors 252 and/or vehicle systems 258. For example, supervised or unsupervised training techniques can be used to learn features and patterns in raw data that are indicative of landmarks.

Block 506 may comprise determining a landmark type and classifying the detected landmark as the determined landmark type. That is, features detected as described above can be tagged according to the sensor that detected the feature and/or the feature itself. For example, a landmark detected based on vertical acceleration can be tagged as a speed bump, while a landmark detected based vehicle heading changes in 2-dimensional space may be classified as a corner. As another example, a landmark detected by an accelerometer may be tagged as a speed bump.

Block 506 may comprise determining a position for the detected landmark. For example, an estimated position of the vehicle corresponding to when the landmark was detected may be associated to the detected landmark. That is, a vehicle may detect a landmark and associate a current position estimation with the landmark as the position of the landmark. In some embodiments, the estimated position of the most recent time window step may be used as the landmark position. In another embodiment, an estimated position of a next time window step may be used as the position.

The detected landmark may be tagged with the position and/or landmark type for storage in a landmark database 514.

At block 508, process 500 checks if a previously detected landmark is registered in landmark database 514 that matches a detected landmark. Landmark database 514 may be an example implementation of landmark database 207. For example, responsive to detecting a landmark, block 508 accesses landmark database 207 and checks if the landmark database 514 holds a landmark of the same type having a position that is within a threshold distance of the current estimated position (e.g., position determined at block 504). In some embodiments, the landmarks maybe determined to be the same type if they are classified as the same type. In another embodiment, landmarks may be matched according to features of detection. For example, a landmark detected as a vertical acceleration can be matched to an earlier landmarked detected as a vertical acceleration. The threshold distance may be set according to a desired implementation. In some embodiments, the threshold distance may depend on positioning errors that are expected to accumulate over time as the vehicle travels longer distances. For example, as accumulated positioning errors accumulate the threshold distance may be increased to account for larger expected errors. In some embodiments, the threshold could be dynamically updated according to the positioning accuracy of the vehicle and landmarks. In an illustrative embodiment, the threshold distance may be set between approximately 3 meters and 10 meters.

In various embodiments, matching at block 508 may ignore altitude (e.g., floor level) of the vehicle when finding a match. In this case, the detected landmark may be matched with an existing landmark from a different floor that the vehicle detected earlier along the vehicle travel path. For example, if the vehicle is currently on the second floor of a multi-floor parking structure and it detected a speed bump, while it may be the first time the vehicle is at this 3-dimensional geolocation (e.g., latitude, longitude, and altitude) on the second floor, the vehicle detected another speed bump at the same geolocation in 2-dimensional space (e.g., same latitude and longitude) while traveling on the first floor. The earlier detected speed bump may be registered in landmark database 514 along with the determined position (e.g., during an earlier iteration of block 506). The speed bump from the first floor can be considered a match with to the detected speed bump if its position in 2-dimensional coordinate space is within a threshold distance of the previously detected speed bump.

If landmark detected at block 506 matches a landmark registered in the landmark database, block 510 corrects the estimated vehicle position from block 504 to the position of the landmark located in landmark database 514 at block 508. For example, in the case of a multi-floor parking structure, block 508 may match a newly detected landmark from the second (or subsequent) floor with a landmark that was detected on the first floor and registered to landmark database 514. Responsive to determining the landmarks match, block 510 corrects the estimated vehicle position in 2-dimensional coordinate space (e.g., longitude and latitude coordinates) from block 504 to the 2-dimensional position of the landmark obtained from landmark database 514. As described above, landmarks in a multi-floor parking structure tend to be located at similar geolocations in 2-dimensional coordinate space for each floor, thus the correction mechanism effectively cancels out positioning error that may accumulate while traveling between floors (e.g., as described in connection to FIG. 4).

In the event that a match for a newly detected landmark cannot be located in the landmark database 514, process 500 proceeds to block 512 to register the new landmark in landmark database 514. For example, if landmark database 514 does not hold a landmark having the same type and/or a landmark is not located that is within the threshold distance of the position of the newly detected landmark, then the newly detected landmark can be registered in landmark database 514. The new landmark can be associated with the estimated vehicle position at the time of detection as the landmark's position. As a result, landmark database 514 can be incrementally updated with landmarks while the vehicle travels throughout the environment.

According to various embodiments, the landmarks and associated positions may be used as nodes to generate a virtual map of the environment. For example, the estimated positions for a number of time steps may be combined with the landmarks registered in landmark database 514, including their positions, to generate a virtual map of the environment. The virtual map may be stored in a map database (e.g., map database 209). According to various embodiments, the virtual map may be synchronized with a cloud server for use by other vehicles.

Figure 6:
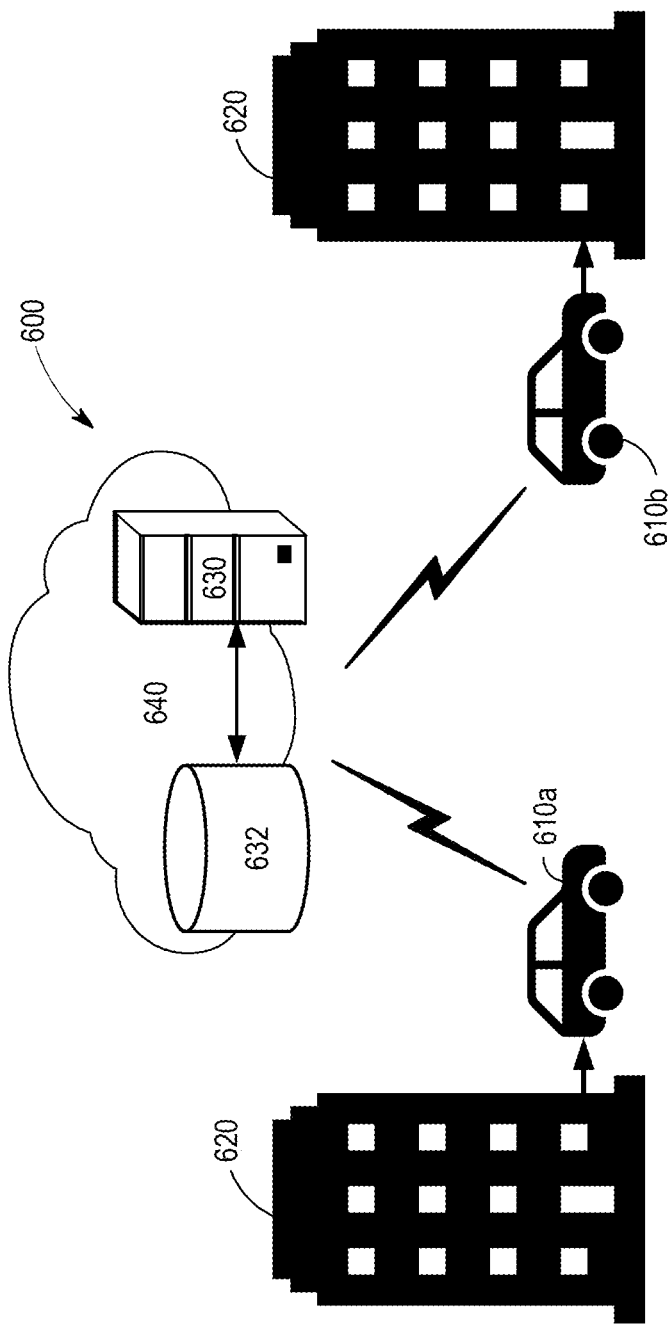
FIG. 6 is a schematic diagram of an example operating environment for cloud-based synchronization of a virtual map generated in accordance with embodiments disclosed herein.

For example, FIG. 6 is a schematic diagram of an example operating environment 600 for synchronizing a virtual map generated in accordance with embodiments disclosed herein. The environment 600 includes at least a first vehicle 610a, a second vehicle 610b, a cloud or edge server 630, and a cloud-based database 632 resident on network 640. The vehicles 610a and 610b may each provide similar functionality and, for example, may each comprise a position correction circuit 210 of FIG. 2. The vehicles 610a and 610b may be communicatively coupled to network 640 through V2X communications. Server 630 may be any computational server resident in a cloud-based infrastructure.

Vehicle 610a may generate a virtual map that can be uploaded to edge server 630 via network 640. In various embodiments, vehicle 610a may execute process 500 to estimate positions, detect landmarks, and correct estimate positions while traveling in indoor environment 620. Vehicle 610a can then generate a virtual map from the corrected position forming a trajectory and the detect landmarks as nodes. Vehicle 610a can then upload the virtual map to server 630 for storage in cloud-based database 632. If cloud-based database 632 has an existing virtual map associated with indoor environment 620 (e.g., based on environment identified such as an address or name), server 630 may synchronize the virtual map by updating the existing virtual map with the newly received map.

Subsequently, vehicle 610b may enter indoor environment 620. Upon entering indoor environment 620, vehicle 610b may lose connection to a satellite based position system and initialize a dead reckoning system (e.g., vehicle position estimation system 273). Vehicle 610b may also check if server 630 has an existing virtual map associated with indoor environment 620. If not, then vehicle 610b can initiate process 500. However, in this example, cloud-based database 632 holds the virtual map from vehicle 610a, which server 630 shares with vehicle 610b. Upon downloading the virtual map to map database 209, vehicle 610b can register landmarks of the virtual map as landmark data in a landmark database (e.g., landmark database 207 and/or landmark database 514). From there, vehicle 610b can execute operations of process 500 using the landmarks from the virtual map.

Figure 7:
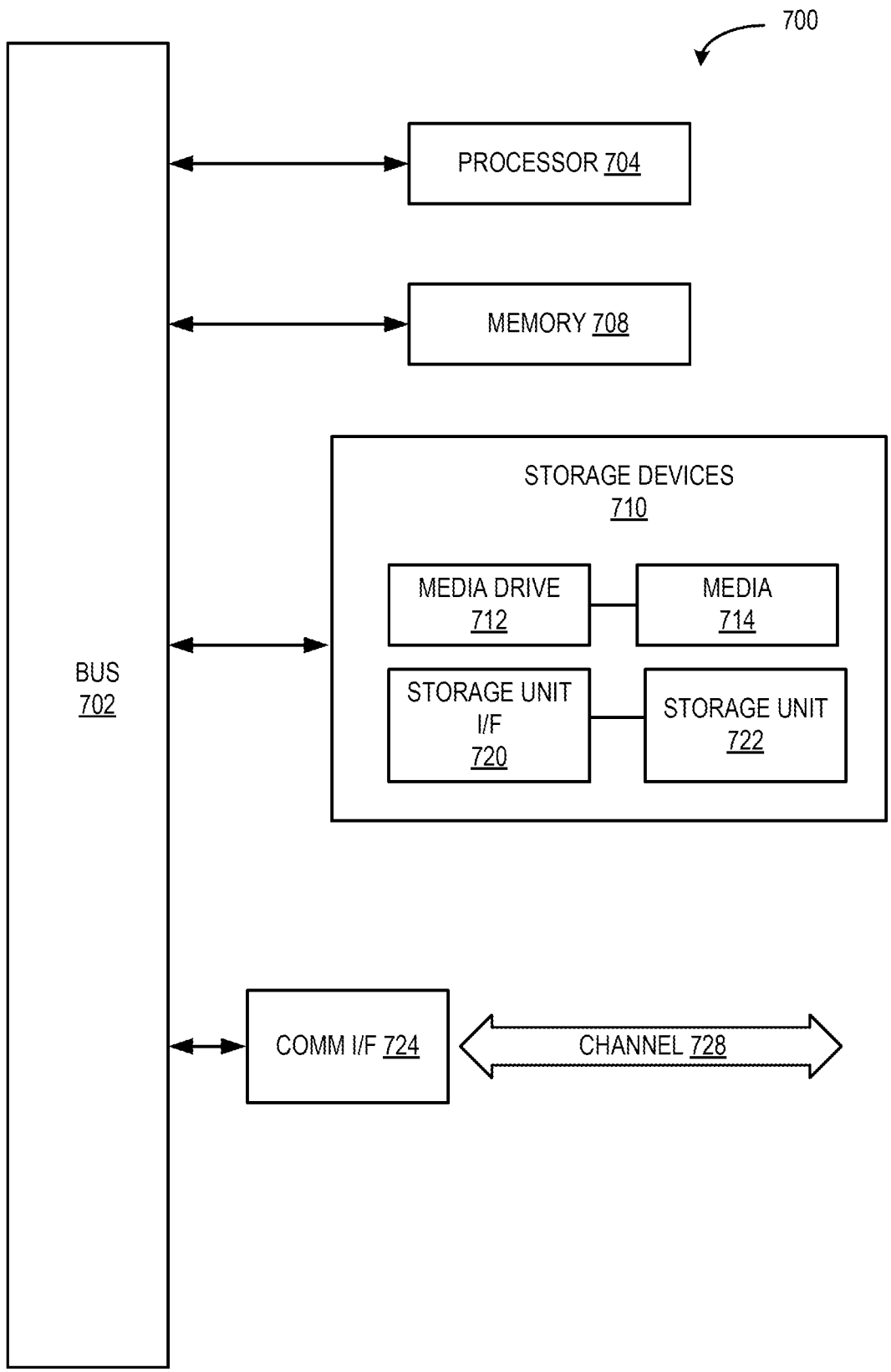
FIG. 7 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor, and/or any one or more of the components making up position correction system 200 of FIG. 2 and/or server 630 of FIG. 6. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 may store instructions for executing operations, such as operations of process 500 of FIG. 5. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or soft modem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for correcting vehicle position estimations, the method comprising:
   detecting, via one or more sensors of a vehicle, a first landmark and determining a position of the detected first landmark on a first level of a multi-level environment while the vehicle travels on the first level;
   detecting, via the one or more sensors, a second landmark and determining a position of the detected second landmark on a second level of the multi-level environment while the vehicle travels on the second level;
   estimating, via a position estimation system of the vehicle, a position of the vehicle on the second level;
   determining whether the detected second landmark is less than a threshold distance in a horizontal dimension from the detected first landmark; and
   updating the estimated position of the vehicle on the second level based on a translation of the determined position of the detected first landmark to the second level when the detected second landmark is less than the threshold distance in a horizontal dimension from the detected first landmark.

2. The method of claim 1, wherein the determined position of the detected first landmark on the first level is determined as an estimated position of the vehicle on the first level.

3. The method of claim 1, wherein the position estimation system of the vehicle comprises a dead reckoning system.

4. The method of claim 1,
wherein updating the estimated position of the vehicle on the second level is responsive to a determination that the second landmark corresponds to the first landmark.

5. The method of claim 4, wherein detecting the first landmark comprises detecting a first landmark type, and detecting the second landmark comprises detecting a second landmark type, and the method further comprises:
   determining the second landmark corresponds to the first landmark when the second landmark type matches the first landmark type.

6. The method of claim 1, wherein the first landmark is detected based on measurements from at least one of: an inertial measurement unit sensor, a wheel spin speed sensor, and a vehicle velocity sensor.

7. The method of claim 1, wherein the multi-level environment is an indoor multi-level environment.

8. The method of claim 1, wherein the multi-level environment is a multi-floor parking structure, the first level is one floor of the multi-floor parking structure, and the second level is another floor of the multi-floor parking structure.

9. The method of claim 1, wherein the updated estimated position of the vehicle on the second level is the translated position of the detected first landmark.

10. A vehicle, comprising:
    a position estimation system;
    a plurality of sensors to detect conditions of a multi-level environment;
    memory storing instructions; and
    one or more processors communicably coupled to the memory and configured to execute the instructions to:
    detect a first landmark and determine a position of the detected first landmark on a first level of the multi-level environment using one or more sensors of the plurality of sensors while the vehicle travels on the first level;
    detect a second landmark and determine a position of the detected second landmark on a second level of the multi-level environment using the one or more sensors while the vehicle travels on the second level;
    estimate a position of the vehicle on the second level using the position estimation system; and
    update the estimated position of the vehicle on the second level based on a translation of the determined position of the detected first landmark to the second level when the detected second landmark is less than a threshold distance in a horizontal dimension from the detected first landmark.

11. The vehicle of claim 10, wherein the determined position of the detected first landmark on the first level is determined as an estimated position of the vehicle on the first level.

12. The vehicle of claim 10, wherein the position estimation system comprises a dead reckoning system.

13. The vehicle of claim 10, wherein updating the estimated position of the vehicle on the second level is responsive to a determination that the second landmark corresponds to the first landmark.

14. The vehicle of claim 13, wherein detecting the first landmark comprises detecting a first landmark type, and detecting the second landmark comprises detecting a second landmark type, and the instructions are further configured to cause the one or more processors:

determine the second landmark corresponds to the first landmark when the second landmark type matches the first landmark type.

15. The vehicle of claim 10, wherein the first landmark is detected based on measurements from at least one of: an inertial measurement unit sensor, a wheel spin speed sensor, and a vehicle velocity sensor.

16. The vehicle of claim 10, wherein the multi-level environment is an indoor multi-level environment.

17. The vehicle of claim 10, wherein the updated estimated position of the vehicle on the second level is the translated position of the detected first landmark.

18. An apparatus, comprising:
a plurality of sensors to detect conditions of a multi-level environment;
a position estimation system to estimate a position of the apparatus within the multi-level environment based on inputs from a first subset of sensors of the plurality of sensors; and
a position correction system to:
detect a plurality of landmarks in the multi-level environment using a second subset of sensors of the plurality of sensors, the plurality of landmarks comprising a first landmark on a first level of the multi-level environment and a second landmark on a second level of the multi-level environment; and
correct the estimated position of the apparatus within the multi-level environment based on a translation of a position of the first landmark to the second level when the second landmark is less than a threshold distance in a horizontal dimension from the first landmark.

19. The apparatus of claim 18, wherein the position estimation system comprises a dead reckoning system.

20. The apparatus of claim 18, wherein the corrected estimated position of the apparatus on the second level is the translated position of the first landmark.

* * * * *